(12) United States Patent
Gordun Burillo

(10) Patent No.: US 7,927,694 B2
(45) Date of Patent: Apr. 19, 2011

(54) WATERPROOFING SHEET

(76) Inventor: Fernando Gordun Burillo, Barcelona (ES)

( * ) Notice: Subject to any disclaimer, the term of this patent is extended or adjusted under 35 U.S.C. 154(b) by 0 days.

(21) Appl. No.: 10/465,941

(22) PCT Filed: Nov. 8, 2001

(86) PCT No.: PCT/IB01/02101
§ 371 (c)(1),
(2), (4) Date: Jun. 26, 2003

(87) PCT Pub. No.: WO02/053367
PCT Pub. Date: Jul. 11, 2002

(65) Prior Publication Data
US 2004/0053036 A1    Mar. 18, 2004

(30) Foreign Application Priority Data
Dec. 28, 2000   (ES) .................................. 200003128

(51) Int. Cl.
*B32B 27/00* (2006.01)
*E04C 1/00* (2006.01)
(52) U.S. Cl. ............... 428/319.3; 428/318.4; 428/318.6; 428/319.7; 428/314.4; 428/314.8; 52/309.4
(58) Field of Classification Search ............... 428/318.4, 428/318.6, 319.3, 319.7, 314.4, 314.8; 52/309.4
See application file for complete search history.

(56) References Cited

U.S. PATENT DOCUMENTS

| | | | | |
|---|---|---|---|---|
| 2,250,773 A | * | 7/1941 | Overton | 34/388 |
| 4,186,068 A | * | 1/1980 | Rubens | 521/50.5 |
| 4,915,542 A | * | 4/1990 | Fernando | 405/150.1 |
| 5,955,165 A | * | 9/1999 | Zamora et al. | 428/36.9 |
| 6,035,582 A | * | 3/2000 | Pacific | 52/58 |
| 6,090,479 A | * | 7/2000 | Shirato et al. | 428/304.4 |
| 6,586,080 B1 | * | 7/2003 | Heifetz | 428/198 |
| 2002/0155274 A1 | * | 10/2002 | Ramesh et al. | 428/317.1 |

FOREIGN PATENT DOCUMENTS

| | | | |
|---|---|---|---|
| EP | 395290 A1 | * | 10/1990 |
| ES | 2118035 | | 1/1998 |
| GB | 2136848 A | * | 9/1984 |
| JP | 8025540 | | 1/1996 |
| JP | 09071675 A | * | 3/1997 |

OTHER PUBLICATIONS

English Abstract of WO 95/18011, Ishii et al, "Partially Foamed, Thermoformed Container and Production Method Thereof", Jul. 6, 1995.*

* cited by examiner

*Primary Examiner* — Hai Vo
(74) *Attorney, Agent, or Firm* — Barnes & Thornburg LLP

(57) ABSTRACT

It comprises three layers: a first layer of plastic material that provides the whole with mechanical strength, a second intermediate layer of foam forming a union between the first and second layer, and a third layer of impermeable plastic material and is characterized in that the first layer (2) is mase on an elastomeric polyolefin of high strength and elasticity, in that the second layer (3) is of closed-cell, physically or chemically cross-linked polyethylene foam, and in that the third layer (4) is of polyolefin with high tear resistance. A light waterproofing sheet is obtained which withstands extreme meteorological conditions, is resistant to chemical agents, while it also has optimum mechanical properties at a lower thickness thanks to the material of which the first layer is comprised and unlike other sheets existing it has no ageing limit, which means that once the sheets have been fitted they do not have to be replaced.

4 Claims, 1 Drawing Sheet

WATERPROOFING SHEET

FIELD OF THE INVENTION

This invention relates to a waterproofing sheet for tunnels, channels and underground constructions in general and for waterproofing roofs and terraces on buildings.

BACKGROUND OF THE INVENTION

In tunnels, mines and underground works in general the presence of water and excess humidity creates considerable problems, whether during the various phases of construction or throughout the life of the work or infrastructure.

The hazards that arise due to the formation of puddles or ice on traffic-bearing surfaces are well known. Similarly, in railway tunnels water is also a danger for the installations, and in regions with very low winter temperatures the formation of ice can break the track by deformation and even prevent the passage of trains.

In any underground construction work, infiltrations of water damage the complex control equipment and operating services, and the reinforced concrete structures often require special treatment to prevent them decalcifying and subsequently expanding due to oxidation of frameworks.

Conventional waterproofing systems resolve many of the aforementioned problems, but their costs are generally high. This is shown particularly when there arise difficulties such as high infiltrations of rain during application of the waterproofing, extreme climatological conditions, and even the need for waterproofing after the building work has been completed.

A type of coating is currently used which consists in sheets made of plastic material, and more specifically PVC. Said sheets have the disadvantage that their PVC content means that they are not biodegradable, while they also have low thermal gaps and low resistance to chemical agents.

Similarly, for several years now the roofs or terraces of buildings have also been waterproofed with PVC sheets or asphalt sheets to protect them from water. However, owing to the materials used in said sheets and the climatological conditions and exposure to sunlight, the sheets undergo ageing and deterioration, which means that they have to be checked and repaired.

Spanish patent no. 9600657, whose holder is the same as that of this patent application, describes a coating or waterproofing sheet, particularly for tunnels, made up of three layers: a first layer of raffia, a second intermediate layer of foam and a third layer of plastic material metallised with aluminium. This sheet has the advantage that the foam is not inflammable and its mechanical strength is higher than that of PVC sheets.

But this type of sheet has the disadvantages of only being applicable in tunnels or channels and showing rapid ageing, which means that the sheet has a short working life.

OBJECTS AND SUMMARY OF THE INVENTION

Description Of The Invention

The objective of the waterproofing sheet of this invention is to solve the disadvantages presented by the sheets known in the state of the art, while further providing a plurality of advantages which are described below.

The sheet of the invention is characterised in that the first layer is made of an elastomeric polyolefin of high strength and elasticity and flexibility, in that the second layer is of closed-cell, physically or chemically cross-linked polyethylene foam, and in that the third layer is of polyolefin with high tear resistance.

Thanks to these characteristics a flat and light waterproofing sheet is obtained which is capable of withstanding extreme meteorological conditions, including temperatures which range from 100° C. down to −60° C., is resistant to chemical agents such as concentrated acids, while it also has optimum mechanical properties at a lower thickness thanks to the material of which the first layer is comprised; unlike the sheets existing in the market it has no ageing limit, which characteristic means that once the sheets have been fitted they do not have to be replaced with new ones due to their having deteriorated. Furthermore, the sheet is cheaper than the sheets currently used, and the fact that it does not contain PVC makes it an ecological and at the same time biodegradable sheet.

Preferably, the elastomeric polyolefin of high strength and high elasticity is polyethylene.

Also preferably, the tensile strength of the sheet is between 24 Mpa and 39 Mpa.

Advantageously, the elongation at rupture lies between 550% and 900%.

According to another aspect of the invention, the layer of polyolefin of high tear resistance has channels formed in it. The running of water from the walls of constructions or excavations, such as tunnels, is thus regulated and guided.

In accordance with an alternative embodiment of the invention, the layer of polyolefin of high tear resistance is smooth and is very suitable for use on the terraces and roofs of buildings.

Advantageously, the layer of elastomeric polyolefin of high strength and high elasticity is resistant to ultraviolet light. This property allows the sheet to withstand continuous exposure to sunlight when said sheets are fitted on the roofs or terraces of buildings.

Preferably, the thickness of the sheet of the invention lies between 3 mm and 50 mm.

BRIEF DESCRIPTION OF THE DRAWINGS

In order to facilitate description of all that has been outlined above, some drawings are attached which show, schematically and solely by way of non-restrictive example, a practical case of embodiment of the waterproofing sheet of the invention. In the drawings.

DETAILED DESCRIPTION OF THE INVENTION

Description of a Preferred Embodiment

Figure 1:
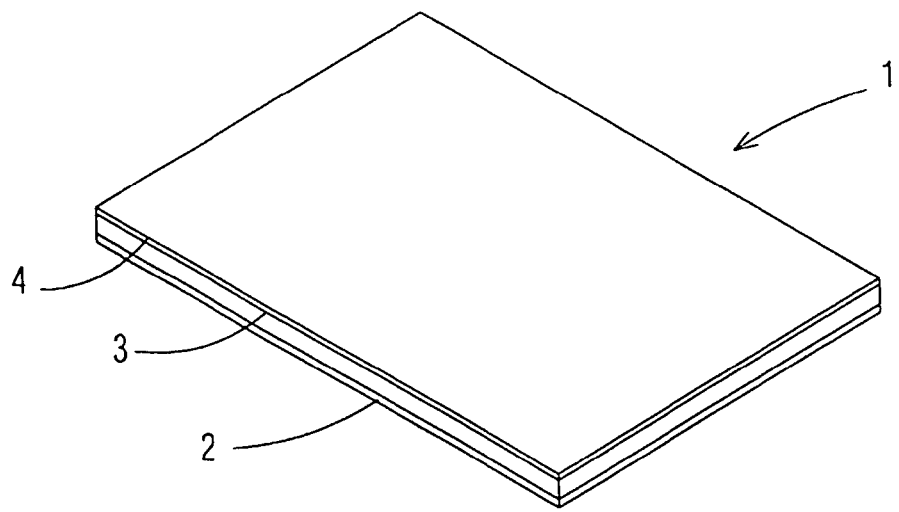
FIG. 1 is a perspective view of one embodiment of the waterproofing sheet of the invention.

As FIG. 1 shows, the waterproofing sheet 1 of the invention is made up of three layers: a first outer layer 2 of elastomeric polyolefin of high strength and high elasticity, with said polyolefin being a polyethylene, a second intermediate layer 3 of closed-cell, physically or chemically cross-linked polyethylene foam, and a third layer 4 made of polyolefin with high tear resistance. Said interior layer 4 is dark in hue and has a smooth profile which makes the sheet 1 easier to fit on roofs and/or outdoor terraces of buildings, thereby providing good thermal insulation and acoustic insulation of impact, while it also has good resistance to ultraviolet light.

Figure 2:
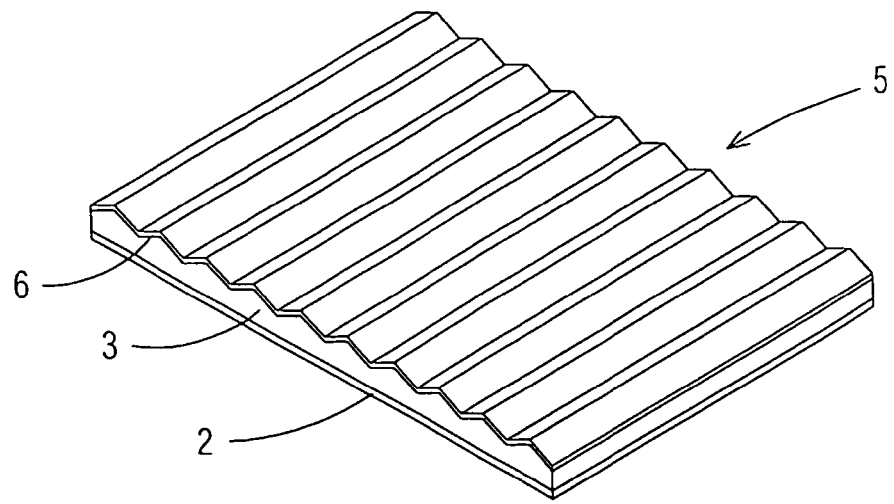
FIG. 2 is a perspective view of a second embodiment of the sheet of the invention.

FIG. 2 shows another embodiment of a sheet 5 of the invention in which the interior layer 6, unlike the previous sheet, has a channelled profile, and is suitable for interior waterproofing of tunnels and similar infrastructure by allowing the water to flow and preventing it accumulating.

Said sheets are placed between the shot concrete or rock and the reinforced concrete, which layout is more commonly known as "sandwich layout".

The process of making the waterproofing sheet 1 of the invention involves a process of extrusion of the polyethylene sheet, which is later thermofused to attach it to the polyolefinic foam that has been compound-bonded to a polyolefinic base film. The final result consists in substantially flat laminar rolls.

There follow details of the tests carried out on the sheet of the invention in order to determine its technical characteristics.

| Tensile strength and elongation at rupture (according to standard UNE-EN ISO 527-3 (96) /2/100): | |
|---|---|
| Dynamometer used | INSTROM 112 |
| Test-piece | Type-2 halterio |
| Thickness (mm) | 4.5 |
| Test temperature (° C.) | 23 ± 1 |
| Jaw separation speed (mm/min) | 100 |
| Initial gap between jaws (mm) | 50 |
| Initial gap between marks (mm) | 20 |
| Tensile strength in longitudinal direction (N/cm) | 192 |
| Tensile strength in transversal direction (N/cm) | 183 |
| Elongation at rupture in longitudinal direction (%) | 665 |
| Elongation at rupture in transversal direction (%) | 665 |

| Resistance to perforation (according to standard UNE 104.300) | |
|---|---|
| Test-piece diameter (mm) | 65 |
| Jaw separation speed (mm/min) | 100 |
| Resistance to perforation (N) | 41.7 |
| Resistance to perforation (N/mm) | 41.7 |

| Resistance to chemical agents | |
|---|---|
| | Chemical degradation |
| $SO_4H_2$ (30%) | No |
| $SO_4H_2$ (3%) | No |
| NaOH (10%) | No |
| NaOH (1%) | No |
| $C_2H_5OH$ (95%) | No |
| $C_2H_5OH$ (50%) | No |
| $(CH_3)_2CO$ | No |
| $CH_3CCOOC_2H_5$ | No |
| $CCL_4$ | No |
| $C_6H_5CH_3$ | No |
| $C_7H_{16}$ | No |
| ClNa (10%) | No |
| $C_6H_5OH$ (10%) | No |
| $H_2O$ | No |
| NO3H (10%) | No |
| ClH (10%) | No |
| $CH_3COOH$ | No |
| $C_{17}H_{33}COOH$ | No |
| $NH_4OH$ (10%) | No |
| $CO_3NA_2$ (2%) | No |
| $H_2O_2$ | 0.23 |
| Oil | No |
| Petrol | No |

Independent of the object of this invention shall be the materials used in manufacturing the pieces which constitute the waterproofing sheet described, together with the shapes and dimensions of same and all accessory details that might be presented, which may be replaced by others that are technically equivalent, as long as they do not affect its essential nature nor depart from the sphere defined by the claims attached below.

The invention claimed is:

1. A combination including:
    a waterproofing sheet in combination with and affixed to a layer of concrete or rock,
    wherein the waterproofing sheet which consists essentially of three layers:
    a first layer of plastic material that provides the whole with mechanical strength,
    a second intermediate layer of foam forming a union between the first and a third layer, and
    the third layer of impermeable plastic material, wherein the first, second and third layers are coextensive to each other, wherein the first layer is made of an elastomeric polyolefin of high strength,
    wherein the second layer is made of closed-cell, physically or chemically cross-linked polyethylene foam,
    wherein the third layer is made of polyolefin with high tear resistance, in that the tensile strength of the sheet is between 24 Mpa and 39 Mpa and the elongation at rupture of the sheet lies between 550% and 900%,
    wherein the waterproofing sheet is suitable for use in tunnels, channels, and underground construction, and
    wherein the third layer of polyolefin includes a plurality of channels provided on a surface of the third layer that faces the layer of concrete or rock in a sandwich layout and the plurality of channels are oriented in the third layer to facilitate the flow of liquid and prevent accumulation of liquid between the waterproofing sheet and the layer of concrete or rock.

2. The combination of claim 1, wherein the elastomeric polyolefin of high strength and high elasicity is polyethylene.

3. The combination of claim 1, wherein the layer of elastomeric polyolefin of high strength and high elasticity is resistant to ultraviolet light.

4. The combination of claim 1, wherein the waterproofing sheet has a thickness in the range of from 3 mm to 50 mm.

* * * * *